United States Patent [19]

Besprozvanny et al.

[11] 4,012,639

[45] Mar. 15, 1977

[54] METHOD OF PRODUCING MINERAL BINDER AND APPARATUS EMBODYING SAME

[76] Inventors: Robert Matveevich Besprozvanny, prospekt Yuria Gagarina, 28, kor. 3, kv. 72; Iosif Gershevich Abramson, Varshavskaya ulitsa 22, kv. 16; Georgy Borisovich Egorov, Grazhdansky prospekt, 90, kor. 2, kv. 103; Rafail Manusovich Nudelman, Nevsky prospekt, 61, kv.; Jury Vasilievich Nikiforov, Zanevsky prospekt, 30, kv. 23, all of Leningrad, U.S.S.R.

[22] Filed: Sept. 15, 1975

[21] Appl. No.: 613,512

[52] U.S. Cl. .............................. 250/492 B; 250/433
[51] Int. Cl.² ........................................ H01J 37/06
[58] Field of Search ............... 250/492 B, 440, 433, 250/437, 438, 492 B; 106/100

[56] References Cited
UNITED STATES PATENTS

| | | | |
|---|---|---|---|
| 3,375,342 | 3/1968 | Robinson | 250/492 B |
| 3,535,205 | 10/1970 | Bate et al. | 250/492 B |
| 3,807,052 | 4/1974 | Troue | 250/492 B |
| 3,891,855 | 6/1975 | Offermann | 250/492 B |

Primary Examiner—Alfred E. Smith
Assistant Examiner—B. C. Anderson
Attorney, Agent, or Firm—Robert E. Burns; Emmanuel J. Lobato; Bruce L. Adams

[57] ABSTRACT

The method consists in that a preground stock is fed in a counter-current flow relatively to the flow of electrons in a beam and is mixed directly in said beam. A mineral binder can be produced in a special apparatus wherein the stock is fed into an irradiation zone by a conveyor at the end whereof is provided a bell placed into an air-tight reaction chamber so that a source of accelerated electrons is coaxial with said bell, said source being arranged at the outlet from the bell, and disposed in the bell with provision for rotation is at least one mixing contrivance which assures uniform distribution of the stock processed at the outlet from the bell in the zone of irradiation. A mineral binder can also be produced in an apparatus wherein the stock is passed from a means of feeding into an airtight reaction chamber which is a rotating drum tilted in the direction away from the means of feeding and towards a source of accelerated electrons while the axis of the source of electrons meets the axis of the drum at an acute angle so that the electrons of the beam are directed in a counter-current flow relatively to the flow of the stock processed.

7 Claims, 4 Drawing Figures

4,012,639

METHOD OF PRODUCING MINERAL BINDER AND APPARATUS EMBODYING SAME

BACKGROUND OF THE INVENTION

The present invention relates to the manufacture of building materials, and more specifically to methods of producing mineral binders and apparatus embodying same.

Widely known nowadays is a thermal method of producing mineral binders, Portland cement in particular, wherein one or another mineral binder is made by sintering a certain stock in a kiln and grounding the clinker so obtained. The main disadvantages of this method are a protracted time period for the process which can last at least a few hours and considerable fuel requirements for maintaining the temperature in the kiln at a sufficiently high point which reaches its maximum between 1400° and 1500° C.

Disclosed quite recently has been a method of producing mineral binders, Portland cement in particular, by exposing a corresponding stock to an ionizing irradiation, a beam of electrons in particular. As it will be noted from the publication, the method is embodied under the conditions of a high vacuum while the material travels down slanting surfaces due to gravity at right angles to the beam of electrons without being mixed.

The advantage of this latter method compared with the thermal one is that it requires no fuel. Yet, the new method suffers from disadvantages of its own which are a non-uniform treatment of the material and the inability to utilize all the energy of electrons.

The known apparatus for producing mineral binders by means of this latter method consists of an air-tight chamber with a feeding device at the top and a discharging arrangement at the bottom. Disposed in the chamber are two continuous tilted troughs, moving down thereon, due to gravity, is the material treated, i.e. the stock. Provided above the troughs is a source of ionizing irradiation, usually a source of electrons emitted in a beam which is directed mainly at right angles to the material treated, i.e., ionized.

The main disadvantage of this apparatus we perceive is that it lacks the mixing of the material, is highly sensitive to the depth of layer and the apparatus is exposed to the destructive action of the ionizing irradiation.

Also known are apparatus for processing a variety of materials by means of ionizing irradiation, each consisting also of an air-tight chamber disposed wherein there is a horizontal conveyor which assures the travelling of the material through the chamber. A source emitting a beam of accelerated electrons is disposed under the conveyor so that the beam of electrons is directed at right angles to the working surface of the conveyor.

The main disadvantage of said apparatus is that the material is treated non-uniformly.

SUMMARY OF THE INVENTION

It is the main object of the present invention to provide a method of producing mineral binders employing the action of a beam of accelerated electrons wherein a uniform distribution of the material in the flow of electrons is assured over the entire volume, and to provide apparatus embodying said method.

Other objects of the invention are to assure a more complete utilization of the energy of electrons, to protect the structural elements of the apparatus from the destructive effect of the irradiation and to assure reliable functioning of the apparatus irrespectively of the depth of the layer formed by the material.

Said and other objects are attained by the fact that in producing a mineral binder by exposing a preground and continuously-fed stock to the action of a beam of accelerated electrons the stock is directed, according to the invention, in a counter-current flow relatively to the flow of electrons in the beam and is mixed directly in the beam.

The method according to the invention allows treating the material in a more uniform way, to utilize the energy of the electron beam more completely and to protect the structural elements of the apparatus from the destructive action of the irradiation.

An apparatus embodying said method of producing a mineral binder, incorporating an air-tight reaction chamber with a source of accelerated electrons and a conveyor for feeding the stock into the chamber and into the zone of irradiation, is provided in the reaction chamber at the discharge end of a conveyor with a bell placed coaxially with the source of accelerated electrons which is arranged at the outlet from the bell contained wherein with provision for rotation is at least one mixing contrivance, assuring uniform distribution of the stock processed in the zone of irradiation. It is expedient to dispose the bell so that its narrowing portion faces the beam of accelerated electrons.

In another apparatus embodying said method of producing a mineral binder, incorporating an air-tight reaction chamber, means of feeding the stock thereinto and a source of accelerated electrons, the reaction chamber is, according to the invention, a rotating drum tilted in the direction away from the means of feeding and towards the source of accelerated electrons while the axis of the source of accelerated electrons meets the axis of the drum at an acute angle so that the electrons of the beam are directed in a counter-current flow relatively to the flow of the stock processed. It is expedient to fit a few scrolls to the inside surface of the drum within the zone of irradiation disposed so that they convey the stock in the direction opposite to the main direction of its travel when the drum is being rotated. The scrolls can be interconnected by tie plates, and it is preferable to heat-insulate the shell of the drum.

BRIEF DESCRIPTION OF THE DRAWINGS

Other objects and advantages of the invention will be best understood from the following description of a preferred embodiment of the invention when this description is being read in conjunction with the accompanying drawings in which.

DESCRIPTION OF THE PREFERRED EMBODIMENTS

Figure 1:
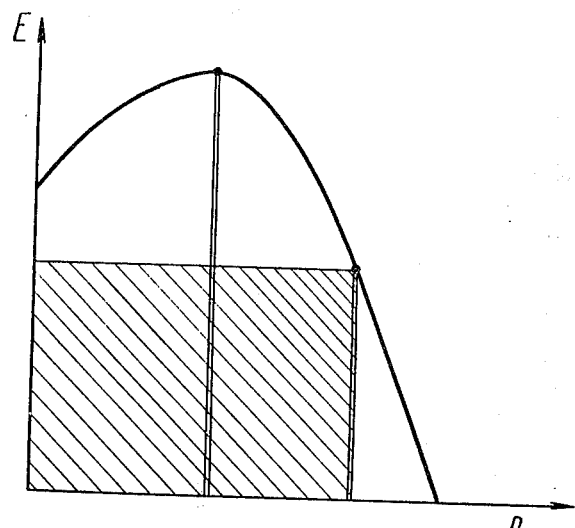
FIG. 1 is a diagram illustrating the way the absorbed energy of electrons is distributed over the thickness of the layer formed by the absorbing material, the mass thickness, R, of the layer in g/cm$^2$ being plotted on the axis of abscissas against the relative amount of the energy absorbed, E, on the axis of ordinates; the curve indicates the relation between the energy absorbed and the thickness of the layer of the absorbing material, and the area hatched shows the useful amount of energy absorbed.

As it will be noted from the appended curve of FIG. I, the energy E of an electron passing through the material is absorbed in a way which is anything but a uniform one, for there is a zone where a peak level of the energy is being absorbed and a zone where the absorption is at its minimum. To enable the process to be completed within the entire volume of the material, a sufficient amount of energy should be liberated in the zone of minimum absorption but the energy liberated for useful purpose will be limited by the area which is hatched in the diagram. The energy above this shaded area is wasted in overirradiating the material and that to the right of the shaded area exerts its action on the structural elements of the apparatus. An increase in the depth of the layer of the material shifts the zone of minimum absorption to the right with the result that the amount of energy wasted in overirradiation increases. A decrease in the depth of the layer shifts the zone of minimum absorption leftward, intensifying the action of electrons on the structural elements of the apparatus.

When the material travels in a counter-current flow with the electrons, the particles thereof do not stay in a certain zone all the time they are exposed to the irradiation. In this case, the particles pass gradually through all the zones of irradiation, absorbing a total amount of energy which does not exceed the limit required to complete the process. This eliminates the unproductive input of the energy for the overirradiation and causes all the energy of the beam of accelerated electrons to be liberated in the layer of material so that the harmful effect of irradiation on the structural elements of the apparatus is also eliminated.

An apparatus, according to the invention, for producing a mineral binder (FIG. 2) incorporates an air-tight reaction chamber 1. Disposed therein is a bell 2. The bell is arranged at the discharge end of a conveyor 3 delivering a stock 4 from a feeding bin 5 into the chamber 1. Used as the conveyor can be any materials handling equipment as, for example, a screw conveyor working in a box which was used by the inventors. Topping the reaction chamber 1 coaxially with the bell 2 and above same is a source 6 of accelerated electrons so that the beam of electrons emitted by the source 6 moves in a counter-current flow relatively to the flow of the material leaving the bell 2.

A detailed description of the source 6 of accelerated electrons is omitted because equipment of this kind is widely known and data thereon can be acquired without difficulty.

The bell 2 can be arranged relatively to the source in a variety of ways but it is preferable to dispose the bell 2 so that its narrowing portion 7 faces the source of accelerated electrons. For mixing the material directly in the zone of irradiation, the bell 2 contains a contrivance 8 fitted with a drive 9 which in the example described is a pair of bevel gears accommodated in an air-tight housing. One of the bevel gears is secured to the end face of the screw and fitted to the axle of the other is the contrivance 8. The contrivance for the mixing of the stock 4 can be given the shape of a paddle, and the number of the contrivances 8 may vary. The lower portion of the reaction chamber 1 is linked up with a means of unloading 10 discharged wherein is the stock processed, i.e., the finished product.

For expelling the gases liberated in the course of irradiating the stock, the reaction chamber 1 is provided with an exhaust pipe 11 connected to a means of exhausting 12. For the recovery of the heat liberated by the material processed, the means of unloading 10 connects to a heat conduit 13.

Figure 2:
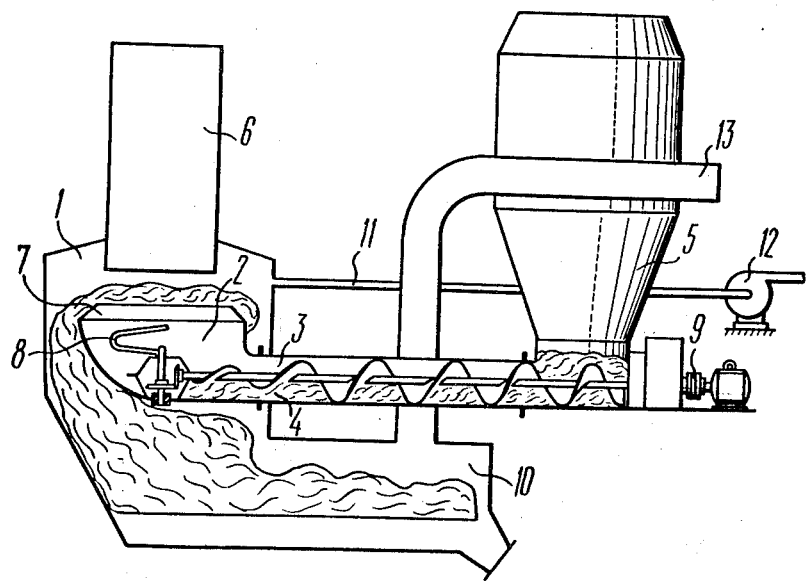
FIG. 2 is a schematic diagram, partly in section, of an elevation view of an apparatus for producing a mineral binder according to the invention, featuring an air-tight reaction chamber and a conveyor for feeding the stock into the chamber.

The apparatus illustrated in FIG. 2 operates on the following lines.

The stock 4, preheated or at the ambient temperature, is delivered by the feeding bin or hopper 5 into the conveyor 3 which, as pointed out above, is a screw. The screw conveys the stock 4 to the bell 2 disposed at the outlet from the screw. The rate of conveying the stock 4 is selected depending on the intensity of irradiation so that the dose of energy received by the stock 4 during the period of staying in the zone wherein it is exposed to the action of the flow of electrons is sufficient to impart the stock the properties required. In the bell 2, the stock 4 travels in a counter-current flow with the flow of accelerated electrons emitted by the source 6. While being irradiated, the stock 4 is also mixed by the contrivance 8. The gases evolved during the process of irradiation are removed through the pipe 11. The material processed is fed by gravity from the bell 2 into the means of unloading 10 wherein heat is being removed from the material and fed through the heat conduit 13 for preheating the stock 4 before entering the conveyor 3.

Figure 3:
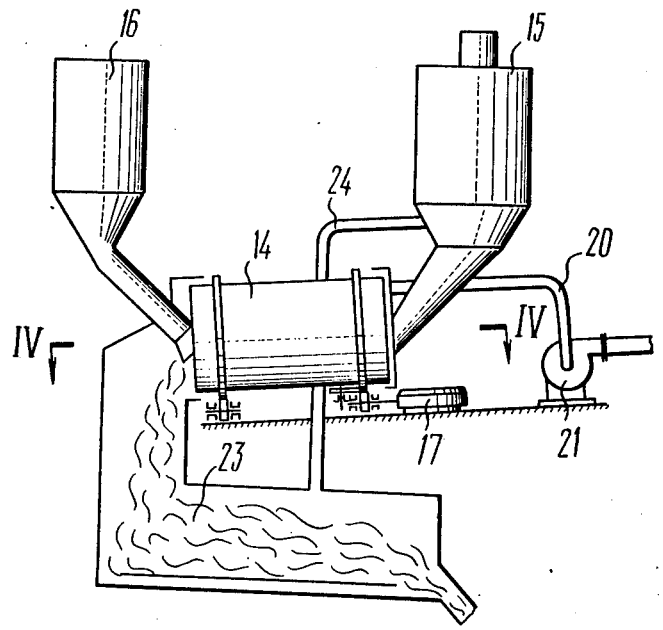
FIG. 3 is a schematic diagram of an elevation view of an apparatus, for producing, according to the invention, a mineral binder with a rotating drum and means of feeding the stock.
Figure 4:
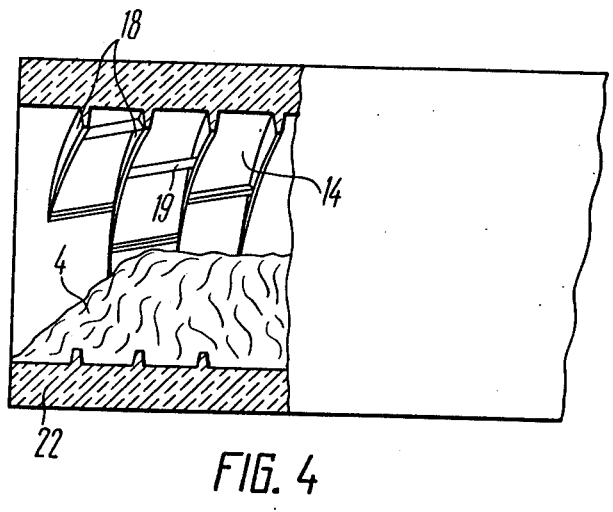
FIG. 4 is a section view taken on line IV—IV of FIG. 3.

The method disclosed can also be embodied in an apparatus (FIG. 3), incorporating an air-tight reaction chamber which is a rotating drum 14 tilted in the direction away from a means of loading 15 and towards a source 16 of accelerated electrons. The drum is rotated with the aid of a drive 17 which can be any known device. The means of loading 15 admits the stock 4 into the drum 14, being linked up with same.

In one embodiment of the drum 14, a few scrolls 18 are provided on its inner surface in the zone of irradiation which cause the stock 4 to move in the direction opposite to the main direction of its movement. It is expedient to interconnect the scrolls 18 by tie plates 19, contributing to a better mixing of the stock. The scrolls 18 and tie plates 19 are given a dimension which enables them to handle only those layers of the material which are disposed close to the walls of the drum 14 outside the beam of electrons emitted by the source 16. Said source is arranged so that its axis meets the axis of the drum 14 at an acute angle. Inserted into the rotating drum 14 is an exhaust pipe 20 connected to a means of exhausting 21 which both removes and utilizes the gases evolved during the irradiation of the stock.

In one embodiment of the invention, the shell of the drum 14 is provided with a heat insulation 22 which makes for a more complete utilization of the heat liberated in the course of irradiating the stock 4.

The drum 14 is linked up with a means of unloading 23 fed wherein is the stock processed, i.e., the finished product. The unloading means 23 communicates with a heat conduit 24 serving to remove the heat liberated in the course of processing the stock.

This second apparatus operates on the following lines. The stock 14, either preheated or at the ambient temperature, is delivered from the means of loading 15 into the rotating drum 14. Since the drum 14 is not only rotating but is also given a tilt, the stock 4 travels in a counter-current flow relatively to the beam of accelerated electrons, being exposed to mixing at the same time. The scrolls 18 interconnected by the tie plates 19 lift the lowermost layers of the stock, moving them backwards at the same time, so that the mixing is a thorough one and no untreated stock leaves the drum 14.

By virtue of the fact that the stock moves in a counter-current flow and is well mixed, it leaves the zone of irradiation being processed uniformly and having absorbed the energy in an amount required for the process to be fully completed. The gases evolved in irradiating the stock 4 are removed from the drum 14 with the aid of the means of exhausting 21 through the pipe 20.

The source 16 of accelerated electrons is arranged outside the rotating drum 14 so that its axis meets the axis of the drum 14 at an acute angle, this feature assuring the travel of the stock 4 in a counter-current flow relatively to the flow of electrons and eliminating the need to control the depth of the layer formed by said stock in the drum 14.

The processed stock leaving the drum 14 is gravity-fed into the unloading means 23 wherein it disposes of the heat which is conveyed over the heat conduit 24 to preheat the stock 4 loaded into the rotating drum 14.

The method disclosed is suitable for the manufacture of any binder, including Portland cement and alumina cement of all kind, gypsum and dolomite binders, etc. It can also be used for processing any bulk material by a beam of electrons, although in our work we have focused our attention on the production of Portland cement.

The method is not confined to the use of the beam of electrons and can find its application with ionizing irradiation of any kind.

What is claimed is:

1. A method of producing a mineral binder comprising, advancing along a path a preground stock of a mineral stock usable for producing a binder therefrom, discharging said mineral stock from said path for movement along a different path, just prior to discharging said mineral stock from the first-mentioned path mixing said mineral stock in a zone in which discharging is taking place, subjecting said mineral stock to irradiation with a beam of accelerated electrons flowing counter to the direction of flow of said mineral stock in said path, and applying said beam of accelerated electrons on said mineral stock in an area in said zone in which said mixing is taking place while said mineral stock is travelling in a direction directly counter to the flow of said accelerated electrons.

2. Apparatus for producing a mineral binder from a mineral stock comprising, means including means having a mouth for flowing in a confined path a preground mineral stock for producing a mineral binder therefrom, said means having means for flowing said mineral stock out of said mouth including mixing means mixing the mineral stock immediately before flowing out of said mouth and during the flow through said mouth, a source of accelerated electrons for applying said accelerated electrons as a beam solely on said mineral stock at said mouth during the mixing thereof and while said mineral stock is flowing counter to the direction of flow of said accelerated electrons.

3. Apparatus for producing a mineral binder from a mineral stock according to claim 2, in which the first-mentioned means comprises a reaction chamber and conveyor means for flowing said mineral stock along said confined path, said means comprising said mouth comprising a bell interiorly of said chamber receiving said mineral stock from said conveyor means, and said mouth defining a zone within in which said accelerated electrons are applied, said bell having sidewalls circumferentially of said zone parallel to the beam of electrons and coaxial therewith, whereby said electrons never strike said sidewalls and irradiate only said mineral stock.

4. Apparatus for producing a mineral binder from a mineral stock according to claim 3, in which said bell has a constriction defining said mouth, and in which said mixing means is disposed in said bell immediately upstream of said constriction.

5. Apparatus for producing a mineral binder from a mineral stock according to claim 2, in which the first-mentioned means comprises a tilted drum driven rotationally about an axis thereof, means for feeding said mineral stock to a higher end of said tilted drum, said mouth being located at a lower end of said drum, and said mixing means comprises scrolls internally of said drum immediately upstream of said mouth.

6. Apparatus for producing a mineral binder from a mineral stock according to claim 5, in which said drum is covered with a heat insulation material.

7. Apparatus for producing a mineral binder from a mineral stock according to claim 5, including means to drive said drum rotationally during irradiation of said stock material with accelerated electrons.

* * * * *